Figure 3:
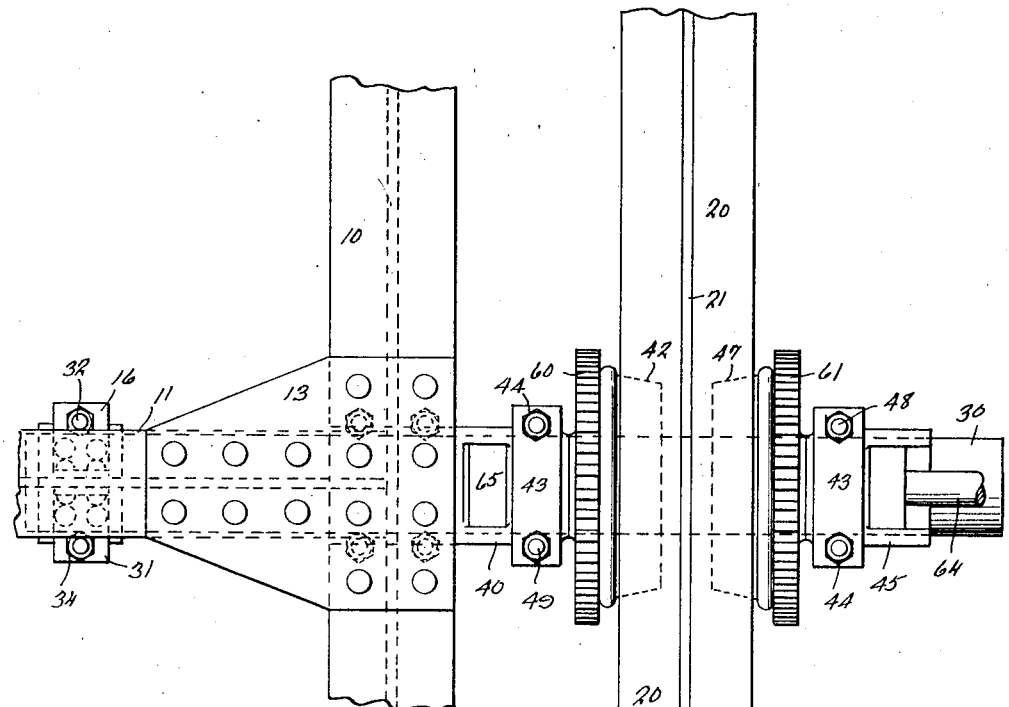

B. F. FITCH.
RUNNING GEAR FOR TRAVELING CRANES.
APPLICATION FILED MAY 26, 1919.
1,347,625.
Patented July 27, 1920.
2 SHEETS—SHEET 1.
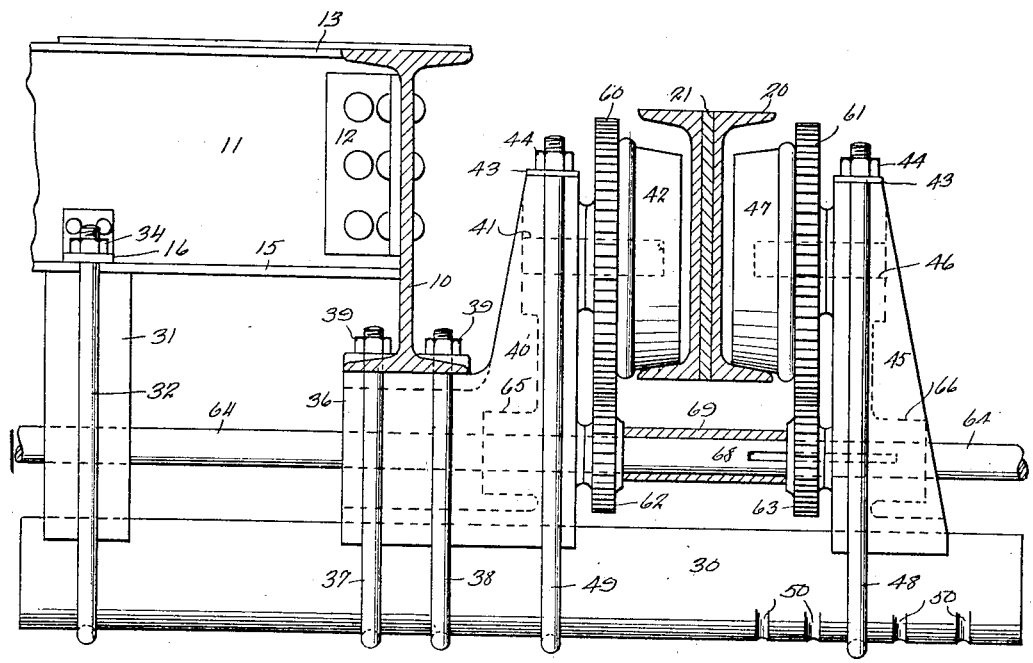

B. F. FITCH.
RUNNING GEAR FOR TRAVELING CRANES.
APPLICATION FILED MAY 26, 1919.

1,347,625.

Patented July 27, 1920.
2 SHEETS—SHEET 2.

Inventor
Benjamin F. Fitch,
By Baker & Macklin,
Attorneys.

UNITED STATES PATENT OFFICE.

BENJAMIN F. FITCH, OF EVANSTON, ILLINOIS, ASSIGNOR TO MOTOR TERMINALS COMPANY, OF WILMINGTON, DELAWARE, A CORPORATION OF DELAWARE.

RUNNING-GEAR FOR TRAVELING CRANES.

1,347,625.

Specification of Letters Patent. Patented July 27, 1920.

Application filed May 26, 1919. Serial No. 299,766.

*To all whom it may concern:*

Be it known that I, BENJAMIN F. FITCH, a citizen of the United States, residing at Evanston, in the county of Cook and State of Illinois, have invented a certain new and useful Improvement in Running-Gears for Traveling Cranes, of which the following is a full, clear, and exact description, reference being had to the accompanying drawings.

This invention relates to traveling cranes and similar structures having wheels riding on overhead trackways. The object is to improve the construction carrying the wheels and connecting them with the frame, such improvements comprising the simplifying of the structure, cheapening it, strengthening it and rendering it adjustable for different widths of track. The invention is hereinafter more fully explained in connection with an illustrative embodiment shown in the drawings, and the essential characteristics are summarized in the claims.

Figure 4:
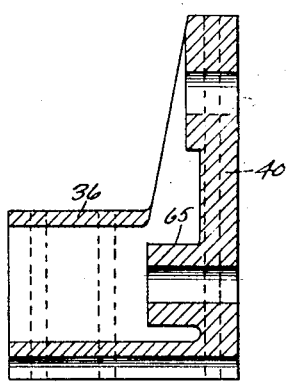

In the drawings, Figure 1 is a side elevation partly in section of a running gear made in accordance with this invention; Fig. 2 is an end elevation of the structure shown in Fig. 1, looking from the right hand end; Fig. 3 is a plan of the structure shown in Figs. 1 and 2; Fig. 4 is a detail in vertical section of one of the bearing brackets employed in this mechanism.

A portion of the frame of a traveling or bridge crane is shown in Figs. 1, 2 and 3, including an I-beam 10 parallel with the supporting trackway, a transverse I-beam 11, angle clips 12 connecting their webs and a gusset plate 13 connecting the top flanges. 20 designates the stationary trackway which is of an I-beam form, shown as constructed of two outwardly facing channels and an interior spacing plate 21. The parts constituting my invention are secured to the frame described and carry the wheels tracking on the lower flange of the track beam 20 and will now be described.

30, in Figs. 1, 2 and 3, indicates a round rolled steel bar which is clamped to the frame by suitable U-bolts extending over the round bar and interposed saddles. Thus, there is a saddle 31 between the round bar and the lower flange of the I-beam 11, and a U-bolt 32 surrounds the bar and lies in vertical grooves in the opposite sides of the saddle, and at its upper end is secured to the frame. The U-bolt is shown as extending alongside the edges of the lower flanges 15 of the I-beam 11 and as passing through openings in clips 16 riveted to these lower flanges. Above the clips suitable nuts 34 screw onto the ends of the bolt. Beneath the lower flange of the I-beam 10 is a saddle 36 which is embraced by a pair of U-bolts 37 and 38 which embrace the round bar 30 and lie in grooves in the opposite sides of the saddle and pass through the lower flange of the I-beam 10 and have nuts 39.

The construction just described rigidly secures the bar 30 to the crane frame. This bar extends beyond the frame and carries the supporting wheels and gearing therefor, if the same have gearing. As shown, the saddle 36 has an upwardly extending portion 40 which carries a stud 41 on which the wheel 42 is journaled. I provide a bracket 45 similar to the portion 40 of the bracket just described, on the other side of the trackway, this bracket or saddle 45 resting on the round bar 30 and carrying a stud 46 for the wheel 47. U-bolts 48 and 49 embrace the round bar and the sides of the saddle 45 and the portion 40 on the opposite side, occupying vertical grooves in the sides of these saddles, and at their upper ends part through plates 43 resting on and overhanging the tops of the saddles. Nuts 44 on the upper ends of these bolts draw them tightly into place.

It will be seen by the construction described the structure may be cheaply made of cast iron saddles and a rolled or forged round bar 30 and rolled tension bolts, the load being carried by the rolled or forged members which have high tensile strength, and the castings being in compression. The entire construction, including the castings and other parts, is accordingly not only very cheap, but, as the strength of the rolled or forged members may be accurately computed, it is not necessary to allow so large a factor of safety. This enables the structure to be made lighter and correspondingly cheaper.

As supporting trackways vary in width of web and flange it is desirable to arrange the structure so that the wheels 42 and 47 may be adjusted toward and from each other. My mechanism provides very readily for this, it being only necessary, for example, to loosen the nuts on the U-bolt 48 and shift this bolt and saddle 45 in or out on the round bar 30. To effectively position the saddle to various locations corresponding to different standards of trackway, I provide a series of notches 50 located in the under portion of the bar 30 and serving to position the U-bolt 48.

In the particular embodiment shown in the drawings the wheels 42 and 47 are intended to be positively driven to shift the crane. To that end each wheel has rigidly secured to it a spur gear, as 60 and 61 meshing with pinions 62 and 63 on a shaft 64, shown as mounted in bearings 65 and 66 provided on the outer faces of the webs of the saddle members 40 and 45. To enable the lateral adjustment above referred to, the pinion 63 is preferably longitudinally slidable on the shaft 64 but connected with it by a feather 68. A suitable distance sleeve 69 surrounding the shaft between the pinions 62 and 63 limits their approach, while the saddles limit any movement in the opposite direction.

When the structure having the driving gearing described is changed in lateral adjustment a different length of sleeve 69 is provided, and the parts are assembled with such sleeve in place, and the U-bolt 48 is placed in the corresponding one of the notches 50. At positions on the crane where no gearing is employed for driving the wheels the saddles may be correspondingly closer to the trackway, and the various notches 50 allow for this adjustment.

It will be seen that the structure is simple, cheaply made and assembled, adjustable to meet various conditions of track dimensions and may have ample strength for the strains to which it is subjected without requiring an excess of weight or material.

I claim:

1. The combination with the structural frame of a traveling crane or similar structure, of a bar secured thereto by tension members and projecting laterally therefrom, a pair of castings riding on the bar, supporting wheels carried by the castings, and tension members securing the bar-castings to the projecting portions of the bar.

2. The combination, with the frame of a traveling crane or similar structure, of a bar clamped thereto and projecting therefrom, a pair of saddles clamped to the bar and adjustable toward or from each other, and supporting wheels carried by the saddles.

3. The combination with a frame, of a bar carried thereby, saddles on the bar, connecting bolts extending from the bottom of the bar to the top of the saddles, and wheels carried by the saddles.

4. The combination with a frame, of a bar carried thereby, saddles engaging the bar, U-bolts embracing the bar and saddles, and wheels carried by the saddles.

5. The combination with a frame, of saddles engaging the same, a bar resting against said saddles, U-bolts embracing the bar and saddles for clamping the bar to the frame, and wheels carried by the bar.

6. The combination with a frame, of saddles engaging the same, a bar resting against said saddles, U-bolts embracing the bar and said saddles, U-bolts embracing the bar to the frame, saddles for clamping the bar to the frame, an additional saddle member engaging the bar, a U-bolt clamping it thereto, and a pair of wheels carried by said saddles.

7. The combination of the frame, of saddles engaging the same and having grooved sides, a bar resting against said saddles, U-bolts embracing the bar and occupying the grooves of the saddles and secured to the frame and wheels carried by the bar.

8. The combination of a frame, a projecting bar, U-bolts embracing the bar and clamping it to the frame and extending about interposed saddles, one of said saddles being extended away from the bar, and a wheel carried by such extended portion.

9. The combination of a frame, a projecting bar, U-bolts embracing the bar, clamping it to the frame about interposed saddles, one of said saddles being extended to form a bearing for a wheel, a wheel carried by such extended portion and another saddle on the bar carrying another wheel facing the wheel first mentioned.

10. The combination of a frame, a bar, U-bolts clamping the bar to the frame upon interposed saddles which are embraced by the U-bolts, one of said saddles having an extended portion, a stud carried by said portion, another saddle engaging the bar, a U-bolt clamping the latter saddle to the bar, a stud carried by the latter saddle, and wheels on said two studs adapted to roll on an interposed trackway.

11. The combination with a frame built of structural members, a rolled or forged extension bar, a cast saddle, a U-bolt embracing the bar and saddle and secured to the frame, and supporting wheels carried by the bar.

12. The combination with the frame built of structural members, a rolled or forged extension bar, saddles, U-bolts embracing the bar and saddles and secured to the frame, another saddle clamped by U-bolts to the bar, and a pair of supporting wheels facing each other and carried on the inner side of the last mentioned saddle, and one of the saddles previously mentioned.

13. The combination of a frame, a projecting bar carried thereby, saddles secured to the bar by tension members, one of said saddles being adjustable longitudinally of the bar, and wheels carried on the inner faces of the saddles.

14. The combination of a frame, a bar carried thereby and projecting therefrom, a pair of saddles engaging the bar, U-bolts embracing the pair of saddles and clamping such parts together, the U-bolts occupying grooves in the sides of the saddles, studs carried by the saddles, and wheels on the studs.

15. The combination of a frame, a bar carried thereby, a saddle resting on the bar, a U-bolt embracing the bar and saddles, said bar having a plurality of notches, any of which may be occupied by the U-bolt to adjustably position the saddle, and a wheel carried by the saddle.

16. The combination of a frame, a bar carried thereby, saddles resting on the bar, U-bolts embracing the bar and saddles clamping said parts together, wheels carried by the saddles, a shaft journaled in the saddles, pinions on the shaft, and gears connected with the wheels and meshing with said pinions.

17. The combination of a frame, a bar secured thereto and extending therefrom, a pair of saddles on the bar clamped to it by U-bolts embracing the bar and the sides of the saddles, one of said saddles being longitudinally adjustable, a shaft journaled to the saddles, wheels carried by the saddles, gears on the wheels, pinions on the shaft meshing with said gears, one of said pinions being longitudinally adjustable on the shaft.

18. The combination of a frame, a bar secured thereto and extending therefrom, a pair of saddles on the bar clamped to it by U-bolts, one of said saddles being longitudinally adjustable, notches on the bar for positioning such adjustment, a shaft journaled to the saddles, wheels carried by the saddles, gears on the wheels and pinions on the shaft meshing with said gears. one of said pinions being longitudinally adjustable on the shaft.

19. The combination of a frame, a pair of saddles resting against it, a projecting bar resting against the saddles, U-bolts embracing the bar and saddles, connecting with the frame for clamping such parts rigidly together, one of the saddles having an extended portion, a wheel carried by said extended portion, another saddle, a U-bolt adjustably clamping it to the bar and a wheel carried by the last mentioned saddle, gears connected with said two wheels, a shaft journaled to the two saddles and two pinions on the shaft meshing with the two gears.

20. The combination of a frame, a pair of saddles resting against it, a projecting bar resting against the saddles, U-bolts for clamping such parts rigidly together, one of the saddles having an extended portion, a wheel carried by said extended portion, another saddle, a U-bolt adjustably clamping it to the bar and a wheel carried by the last mentioned saddle, gears connected with said two wheels, a shaft journaled to the two saddles and two pinions on the shaft meshing with the two gears.

In testimony whereof I hereunto affix my signature.

BENJAMIN F. FITCH.